US011712326B2

(12) United States Patent
Schwarz et al.

(10) Patent No.: US 11,712,326 B2
(45) Date of Patent: Aug. 1, 2023

(54) PERSONAL CARE DEVICE

(71) Applicant: Braun GmbH, Kronberg (DE)

(72) Inventors: Tobias Schwarz, Schmitten (DE);
Julius Hoppert, Kronberg (DE);
Riccardo Dessi, Frankfurt (DE);
Christian Ellsaesser, Kelkheim (DE)

(73) Assignee: Braun GmbH, Kronberg (DE)

( * ) Notice: Subject to any disclaimer, the term of this patent is extended or adjusted under 35 U.S.C. 154(b) by 539 days.

(21) Appl. No.: 16/864,870

(22) Filed: May 1, 2020

(65) Prior Publication Data
US 2020/0345129 A1 Nov. 5, 2020

(30) Foreign Application Priority Data

May 2, 2019 (EP) .................................... 19172250

(51) Int. Cl.
*A61C 17/16* (2006.01)
*A61C 17/34* (2006.01)
(Continued)

(52) U.S. Cl.
CPC .............. *A61C 17/16* (2013.01); *A61C 17/22* (2013.01); *A61C 17/3409* (2013.01); *A46B 5/0095* (2013.01); *A46B 7/042* (2013.01); *A46B 9/04* (2013.01); *A46B 13/008* (2013.01); *A46B 13/02* (2013.01)

(58) Field of Classification Search
CPC ... A61C 17/221; A61C 17/16; A61C 17/3481; A61C 17/22; A61C 17/3409; A61C 17/26; A61C 17/34; B26B 21/526; H01R 12/58; H01R 13/2428; H01R 43/0256
See application file for complete search history.

(56) References Cited

U.S. PATENT DOCUMENTS 4,541,034 A 9/1985 Fanning
2003/0236026 A1 12/2003 Endo
(Continued)

FOREIGN PATENT DOCUMENTS

CN 101185220 A 5/2008
CN 106420095 A 2/2017
(Continued)

OTHER PUBLICATIONS

Extended European Search Report and Search Opinion; Application Ser. No. 19172250.3; dated Oct. 10, 2019; 6 pages.
(Continued)

*Primary Examiner* — Laura C Guidotti
(74) *Attorney, Agent, or Firm* — Vladimir Vitenberg (57) ABSTRACT

A personal care device, such as an electric toothbrush, has a handle having a longitudinal axis and a treatment head connected to a carrier. The carrier extends within the handle and is mounted at the handle for pivoting motion around a pivot axis against a restoring spring force. A drive unit, such as a linear actuator, is mounted on the carrier, and at least one electrical connector is arranged between the handle and the carrier to convey electrical energy from an energy source fixedly mounted with respect to the handle to the drive unit. The electrical connector can be realized as an elastic metal sheet element having a spring constant for providing at least a part of the restoring spring force.

23 Claims, 5 Drawing Sheets

(51) Int. Cl.
  *A61C 17/22* (2006.01)
  *A46B 13/00* (2006.01)
  *A46B 5/00* (2006.01)
  *A46B 7/04* (2006.01)
  *A46B 9/04* (2006.01)
  *A46B 13/02* (2006.01)

(56) References Cited

U.S. PATENT DOCUMENTS

| | | |
|---|---|---|
| 2010/0021860 A1 | 1/2010 | Christman et al. |
| 2010/0066182 A1 | 3/2010 | Yamazaki |
| 2011/0289699 A1 | 12/2011 | Schaefer |
| 2011/0314677 A1 | 12/2011 | Meier |
| 2014/0015346 A1 | 1/2014 | Schober |
| 2015/0198215 A1 | 7/2015 | Koyama |
| 2016/0046028 A1 | 2/2016 | Meier et al. |
| 2017/0079421 A1 | 3/2017 | Tamminga |
| 2018/0019650 A1 | 1/2018 | Schober |
| 2018/0087631 A1 | 3/2018 | Kramp |
| 2019/0125067 A1 | 5/2019 | Schaefer |

FOREIGN PATENT DOCUMENTS

| | | | | |
|---|---|---|---|---|
| CN | 106456303 A | 2/2017 | | |
| CN | 107753134 A | 3/2018 | | |
| DE | 29506422 U1 | 8/1995 | | |
| EP | 2218559 A1 * | 8/2010 | ............ | B26B 21/52 |
| EP | 2790309 | 10/2014 | | |
| EP | 3300689 A1 | 4/2018 | | |
| JP | 2001135382 A | 5/2001 | | |
| JP | 2003038530 A | 2/2003 | | |
| JP | 3728874 B2 | 10/2005 | | |
| WO | WO 2018/193347 A1 * | 10/2018 | ............ | H01R 12/70 |
| WO | WO2019130705 | 7/2019 | | |

OTHER PUBLICATIONS

International Search Report and Written Opinion; Application Ser. No. PCT/IB2020/054212; dated Jun. 2, 2020; 13 pages.

* cited by examiner

PERSONAL CARE DEVICE

FIELD OF THE INVENTION

The present disclosure is concerned with a personal care device such as an electric toothbrush that has an energy source and an electrical energy consuming unit such as a drive unit and an electrical connector for connecting the energy source and the electrical energy consuming unit, where in particular the energy source and the energy consuming unit are movably mounted with respect to each other.

BACKGROUND OF THE INVENTION

It is generally known that the electrical connection between two electrical components that move relative to each other poses technical challenges as the electrical connection must have a certain resistance against fatigue due to the repetitive relative movement of the two electrical components. A flexible flat cable (FFC) may be used and the connection joints may be equipped with strain relief measures.

It is an object of the present disclosure to provide a personal care device that comprises an electrical connector between an energy source and an energy consuming device that are mounted for relative motion, where the electrical connector is particularly suited for withstanding the stress of repetitive relative motion and further where the electrical connector may also be suited to enable an automated assembly of the personal care device.

SUMMARY OF THE INVENTION

In accordance with one aspect, a personal care device, in particular an electric toothbrush, is provided that has a handle that can be grasped by a user's hand, the handle having a longitudinal axis, a treatment head that is connected with a carrier, which carrier extends within the handle and is mounted at the handle for pivoting motion around a pivot axis against a restoring spring force, an electrical energy consuming unit, in particular a drive unit such as a linear actuator, mounted on the carrier, and at least one electrical connector arranged between the handle and the carrier to convey electrical energy from an energy source fixedly mounted with respect to the handle to the electrical energy consuming unit, wherein the electrical connector is realized as an elastic metal sheet element having a spring constant for providing at least a part of the restoring spring force.

BRIEF DESCRIPTION OF THE DRAWINGS

The present disclosure will be further elucidated by a detailed description of example embodiments and with reference to figures. In the figures

DETAILED DESCRIPTION OF THE INVENTION

In the context of the present description "personal care" shall mean the nurture (or care) of the skin and of its adnexa (i.e. hairs and nails) and of the teeth and the oral cavity (including the tongue, the gums etc.), where the aim is on the one hand the prevention of illnesses and the maintenance and strengthening of health ("care") and on the other hand the cosmetic treatment and improvement of the appearance of the skin and its adnexa. It shall include the maintenance and strengthening of wellbeing. This includes skin care, hair care, and oral care as well as nail care. This further includes other grooming activities such as beard care, shaving, and depilation. A "personal care device" thus means any device for performing such nurturing or grooming activity, e.g. (cosmetic) skin treatment devices such as skin massage devices or skin brushes; wet razors; electric shavers or trimmers; electric epilators; and oral care devices such as manual or electric toothbrushes, (electric) flossers, (electric) irrigators, (electric) tongue cleaners, or (electric) gum massagers. This shall not exclude that the proposed personal care system may have a more pronounced benefit in one or several of these nurturing or device areas than in one or several other of these areas. In the below description with reference to the figures, an electric toothbrush was chosen to present details of the proposed personal care device. To the extent in which the details are not particular to an electric toothbrush, the proposed technology can be used in any other personal care device.

A personal care device in accordance with the present disclosure comprises an energy consuming unit that is mounted for pivoting motion relative to a handle of the personal care device. The personal care device comprises a carrier on which the energy consuming unit is mounted, and the carrier is mounted for said motion relative to the handle, in particular a pivoting motion around a pivot axis. The carrier may extend within the handle, but a portion of the carrier or a part that is essentially non-movably connected with the carrier may extend outside of the inner cavity of the handle (this outside extending part may be a treatment head of the personal care device). The handle of the personal care device may have a longitudinal axis and the pivot axis may then be arranged to be about perpendicular to the longitudinal axis of the handle. An energy source is fixedly mounted at or with respect to the handle. Here, "fixedly mounted" shall mean that the fixedly mounted object cannot move relative to the handle, which includes that the object (here: the energy source) may be mounted on a mounting structure that in an assembly process is inserted into the inner cavity of the handle so that the mounting structure becomes secured at the handle. The carrier may be connected with a treatment head of the personal care device, where the treatment head may be arranged to be detachable, in particular repeatedly detachable and again attachable, but essentially not movable with respect to the carrier during use of the personal care device. The carrier may be arranged for pivoting motion around the pivot axis when a force is applied at the treatment head that has a force component that creates a torque with respect to the pivot axis. In some embodiments, the energy consuming unit is a drive unit for driving at least a portion of the treatment head into motion.

The drive unit may have a drive shaft to which at least a portion of the treatment head is connected. The drive unit may comprise a DC motor or a resonant actuator (i.e. a resonant spring-mass type of motor that provides at least one of a linear or rotational oscillation motion via the drive shaft).

In order to electrically connect the energy source and the energy consuming unit, at least one electrical connector is arranged between the handle and the carrier for transferring electrical energy from the energy source to the energy consuming device. While the number of electrical connectors in accordance with the present disclosure is not limited, in some embodiments two such electrical connectors are utilized to establish one closed electronic circuit. The electrical connector is realized as an elastic metal sheet element that has a spring constant and which elastic metal sheet element gets in particular compressed when the carrier moves out of its rest position with respect to the handle so that the elastic metal sheet element provides a restoring spring force in accordance with its spring constant and the compression distance. The personal care device may comprise a mechanical stopper element to define the rest position of the carrier when no external force acts on the treatment head that leads to a pivoting motion. The elastic metal sheet element may in particular provide a biasing or pre-load force when the carrier is in its rest position, which biasing force needs to be overcome by the external force before the carrier starts to pivot.

The elastic metal sheet element may take a specific form. In some embodiments, the elastic metal sheet element has a first essentially horizontal arm and a second essentially horizontal arm, which horizontal arms are connected by a transverse arm so that an essentially Z-shaped (or S-shaped) structure results. The horizontal arms may be equipped with structures that support an automated assembly. E.g. the first or second horizontal arm may comprise at least one vertically extending projection that extends through a slot in a connector element and is coupled there to conductive areas by means of a soldered connection. The connector element may in particular be a printed circuit board (PCB). The slot may be open at one side to allow that the projection and the slot are moved relatively to each other in an assembly process such that the projection enters the slot via its open end in an assembly process. The open end of the slot may be chamfered so that a potential offset between slot and projection is balanced out. E.g. the first or second horizontal arm may comprise at least one vertically extending projection that abuts a side of a connector element. E.g. the first or second horizontal arm may comprise at least one cut-out through which a holder element (e.g. a holder finger) from a connector element extends. E.g. in an assembly process, the cut-out and the holder element may be moved relative to each other so that the holder element at the end extends through the cut-out. In case the holder element is made from plastic, the protruding portion of the holder element may be plastically deformed to fixedly keep the elastic metal sheet element in place. A soldered connection joint may be realized at least on one of the two horizontal arms, e.g. with a conducting area on the connector element or with a conducting wire. A cut-out may be provided at least at one of the two horizontal arms. The processes of plastically deforming a plastic holder element and of establishing a soldered connection are susceptible for automation.

As has been explained, the horizontal arms of the elastic metal sheet element may serve for positioning and holding purposes and the transverse arm may then provide the spring function.

The elastic metal sheet element may be made from CuNi3Si1Mg material, which is commercially available, e.g., as Wieland-K55 from company Wieland-Werke AG, Ulm, Germany. This material provides on the one hand good electrical conductivity and on the other hand has good mechanical properties to serve as elastic element (i.e. spring element). This is just one example of suitable materials.

The personal care device may comprise at least one further spring element (i.e. a further spring element other than the elastic metal sheet element(s)), in particular two spring elements, that are arranged between the handle and the carrier and which at least one spring element provides a restoring spring force between the carrier and the handle when the carrier is pivoted out of its rest position. This at least one spring element may be specified such that the total restoring spring force between the carrier and the handle is mainly provided by the at least one spring element. E.g. the at least one spring element may provide more than about 50% of the total restoring spring force, in particular it may provide more than about 66% of the total restoring spring force, further in particular it may provide more than about 80% of the total restoring spring force, and even further in particular it may provide more than about 90% of the total restoring spring force. The at least one spring element may be designed for high precision and low manufacturing tolerances, e.g. the spring element may be designed as a rectangular bar element made from spring steel. Manufacturing tolerances of the elastic metal sheet element may thus be compensated to some extent.

It had been mentioned that the elastic metal sheet element provides a biasing or pre-load force in the rest state of the carrier. This biasing force may be in the range of between 0.1 N to 0.6 N, in particular in the range of between 0.2 N and 0.5 N and further in particular in the range of between 0.3 N and 0.4 N.

The elastic metal sheet element may be made from a metal sheet that has a thickness in the range of between 0.1 mm to 0.2 mm, in particular in the range of between 0.125 mm to 0.175 mm and further in particular of about 0.15 mm.

The spring constant of the elastic metal sheet element may be in the range of between 0.1 N/mm to 0.55 N/mm, in particular in the range of between 0.2 N/mm and 0.45 N/mm and further in particular of about 0.32 N/mm.

Figure 1:
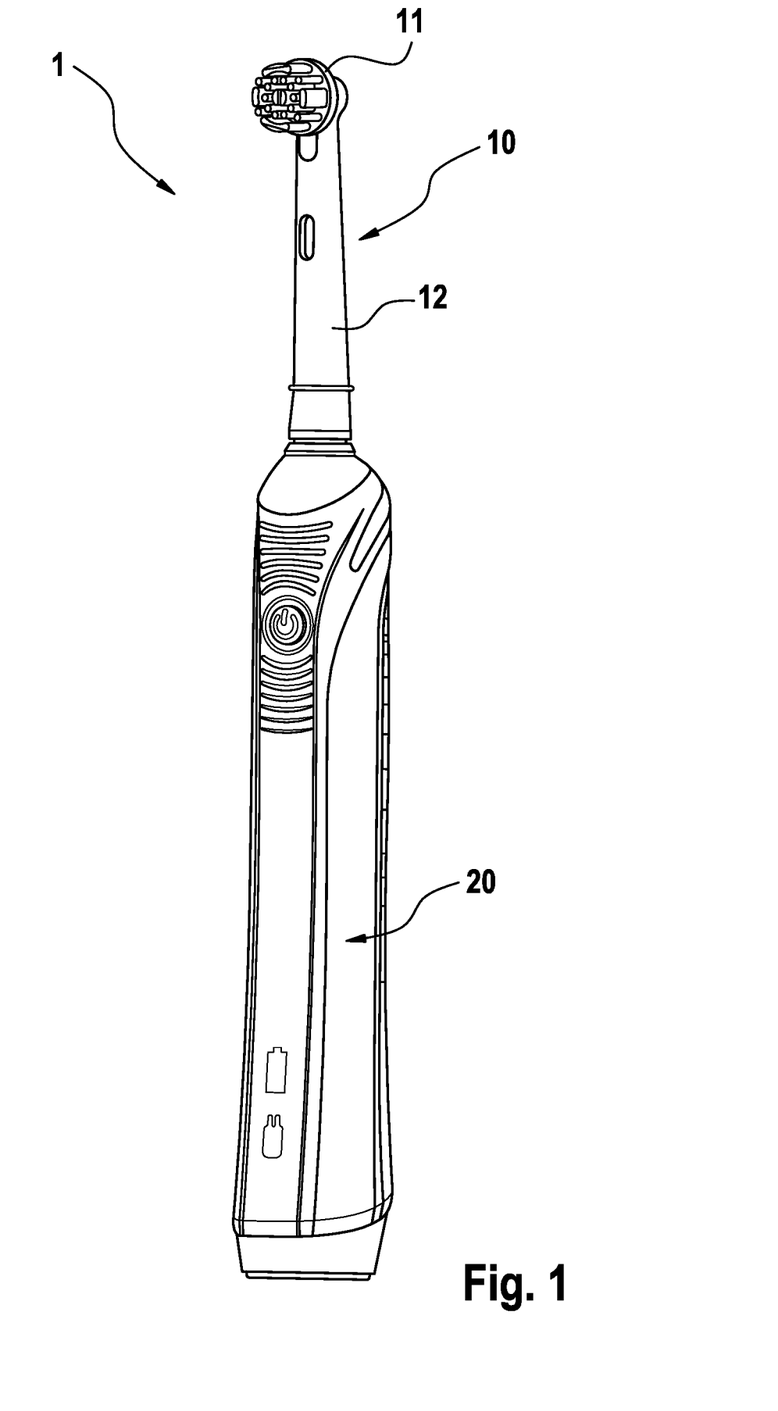
FIG. 1 is a depiction of an example personal care device.

FIG. 1 is a depiction of an example personal care device 1 realized as an electric toothbrush. The personal care device 1 has a handle 20 and a treatment head 10 here realized as a brush head. The treatment head 10 may be replaceable (i.e. repeatedly detachable and again attachable and in particular exchangeable with a new or different treatment head for hygienic reasons or for reasons of providing a different treatment). The treatment head 10 may have a functional head 11 (here: bristle carrier) that is arranged for being driven into motion, in particular by a drive unit disposed in an inner cavity of the handle 20. The treatment head may have a housing 12 for connecting the treatment head 10 with a carrier that extends in the hollow handle 20. In other embodiments, the treatment head 10 does not comprise an independently movable functional head and the treatment head 10 is entirely driven into a motion, which shall not exclude that the treatment head 10 is driven into one motion, while the functional head 11 is driven into another motion.

Figure 2:
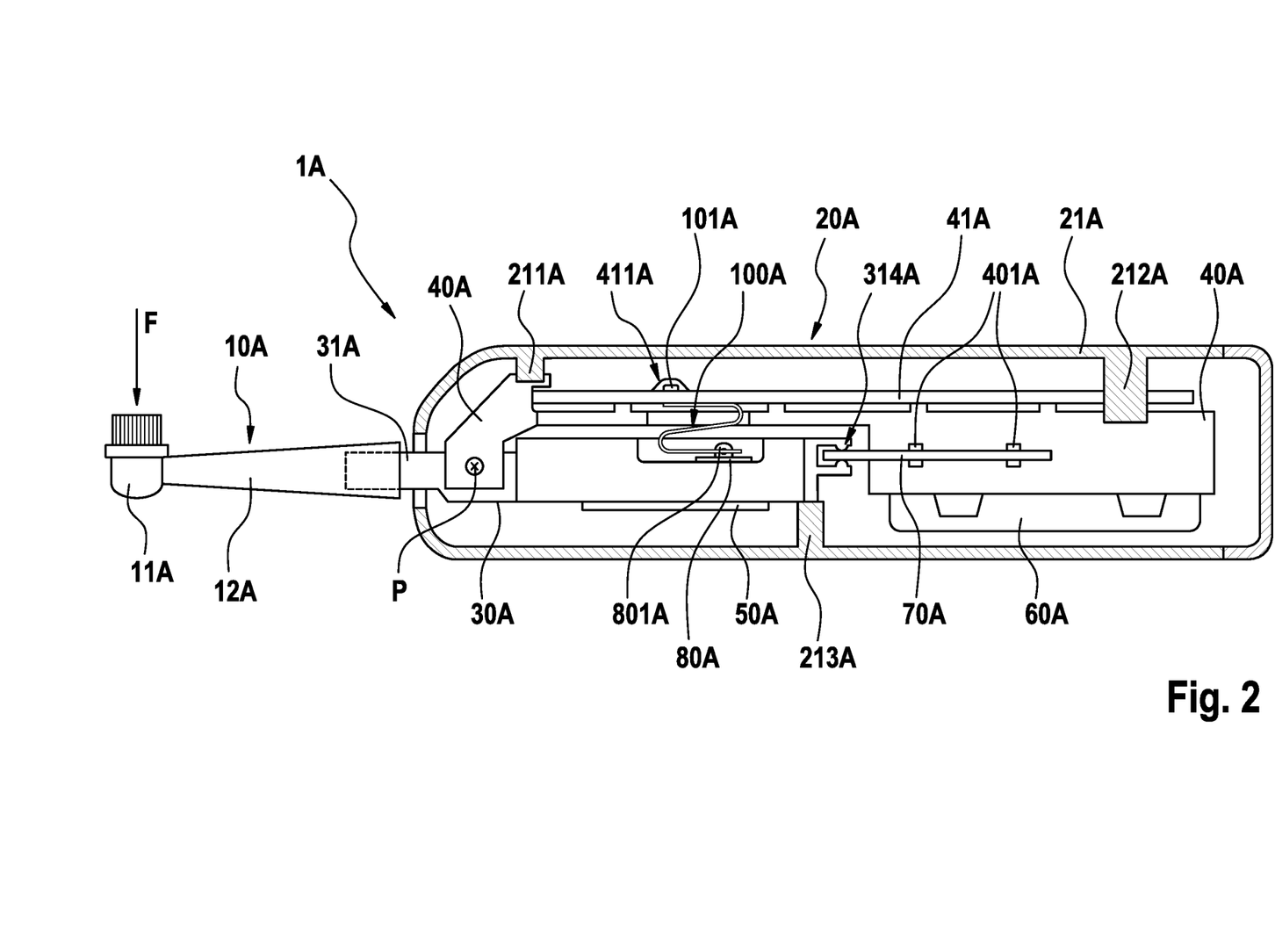
FIG. 2 is a schematic depiction of an example embodiment of a personal care device in accordance with the present disclosure.

FIG. 2 is a schematic depiction of an example structural arrangement of a personal care device 1A in accordance with the present description. The personal care device 1A comprises a treatment head 10A, a handle 20A having a handle housing 21A, a carrier 30A, a mounting structure 40A, an energy consuming unit 50A, here realized as a drive unit, an energy source 60A, and an electrical connector 100A. The treatment head 10A comprises a functional head 11A and a housing 12A, which housing is coupled with an adaptor element 31A that is fixedly connected with the carrier 30A (the adaptor element 31A may also be integral with the carrier 30A). The fixed connection of the treatment head 10A shall not exclude that the treatment head 10A can be detached from the adaptor element 31A. The carrier 30A is pivotably mounted at the mounting structure 40A so that the carrier 30A can pivot around a pivot axis P relative to the mounting structure 40A when an external force F is applied at the treatment head 10A that is essentially non-movably mounted at the carrier 30A, which treatment force F generates a torque with respect to the pivot axis P. The mounting structure 40A is fixedly secured at the handle housing 21A, e.g. by means of snap connections 211A, 212A or the like (e.g. clamping may be an alternative) so that the mounting structure 40A can essentially not move relative to the handle housing 21A and one may consider the handle housing 21A and the mounting structure 40A to be one single element. A connector element 41A is part of the mounting structure 40A or is mounted at the mounting structure 40A. This shall not exclude that the carrier 40A is itself the connector element. Here, the connector element 41A is a PCB that is fixedly mounted at the mounting structure 40A. Further, the energy source 60A, e.g. a battery or an accumulator, is mounted at the mounting structure 40A as well. The electrical connector 100A is realized as an elastic metal sheet element (i.e. as an electric current conducting spring element) that has a spring constant that provides a restoring spring force once the carrier 30A pivots out of its rest position with respect to the handle 20A (i.e. with respect to the mounting structure 40A) around the pivot axis P. The electrical connector 100A has on one end a projection 101A that is conductively coupled with a conductive area on the connector element 41A by means of a soldered connection 411A. On the other end, the electrical connector 100A is connected with a connector element 80A by means of a projection 801A. The connector element 80A may be a coil bobbin that carries a coil of a drive unit. The connector element 80A is fixedly connected with the carrier 30A. It shall not be excluded that the connector element on carrier-side is realized by the carrier 30A itself. The projection 801A may be conductive and may establish a conducting connection with the coil (i.e. the energy consuming unit 50A). But the electrical connector 100A may be conductively connected with the energy consuming unit 50A in another manner, e.g. a conductive wire may be wound around the lower horizontal arm of the electrical connector 100A and/or the wire may be soldered at the electrical connector 100A. A further electrical connector may be arranged between carrier 30A and mounting structure 40A to complete a conductive circuit between energy source 60A and energy consuming unit 50A.

In the shown example, a spring element 70A extends between the carrier 30A and the mounting structure 40A, which spring element 70A has a spring constant and provides a restoring spring force that adds to the restoring spring force that is applied by the electrical connector 100A so that a total restoring spring force results. The spring element 70A is here fixed in a pivot bearing 314A on the side of the carrier 30A and by clamping elements 401A on the side of the mounting structure 40A.

A mechanical stopper element 213A may be provided at the handle 20A to define a rest position of the carrier 30A in the unloaded state.

Figure 3A:
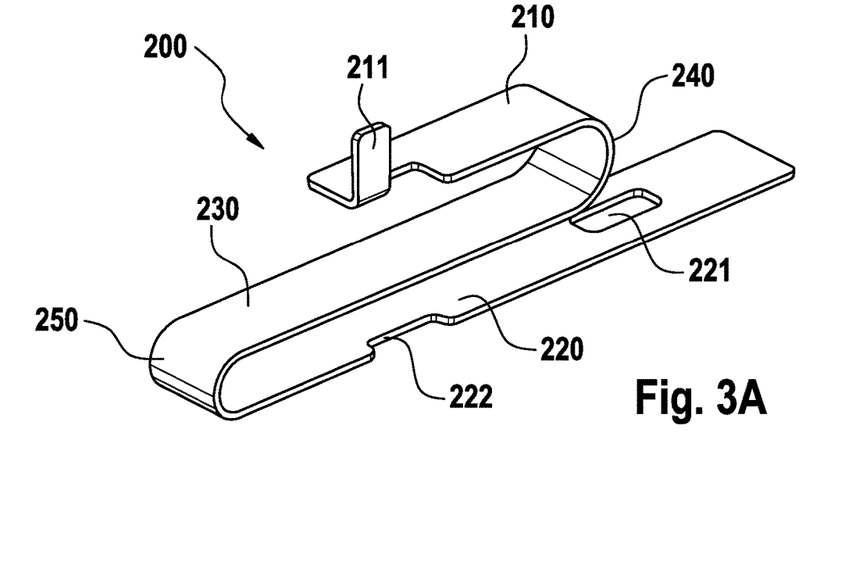
FIG. 3A-3D are different views of an example embodiment of an electrical connector.
Figures 3B, 3D:
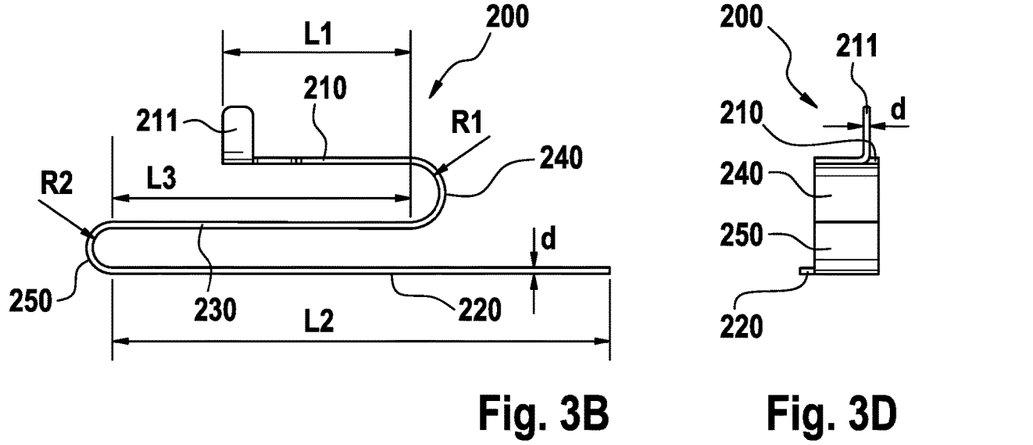
Figure 3C:
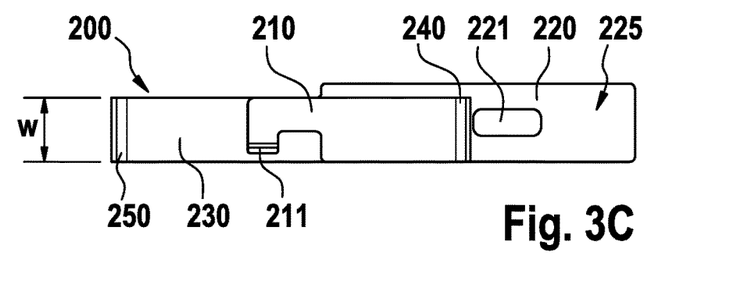

FIGS. 3A to 3D are various views onto an example electrical connector 200 in accordance with the present disclosure. FIG. 3A is a perspective view of the electrical connector 200, FIG. 3B is a side view, FIG. 3C is a top view and FIG. 3D is a front view.

The electrical connector 200 is made from a metal sheet that was cut and bent into the shape as shown. The elastic metal sheet element (i.e. the electrical connector) 200 has generally a Z- or S-shape (depending on the viewing direction). FIGS. 3A to 3D show the elastic metal sheet element 200 in the shape it may take in the assembled state when the carrier is in its rest position. In this rest position, the elastic metal sheet element 200 has a first horizontal arm 210, a second horizontal arm 220 and a transverse arm 230 connecting the two horizontal arms 210, 220. The transverse arm 230 is connected to the horizontal arms 210 and 220 by means of about 180 degrees curved sections 240 and 250. The curvature of the curved sections 240, 250 is essentially circular. The radius R1 of the first curved section 240 connecting the first horizontal arm 210 and the transverse arm 230 is larger than the radius R2 of the second curved section 250 that connects the transverse arm 230 and the second horizontal arm 220. The radii R1 and R2 are different for reasons that will be explained further below. The first horizontal arm 210 comprises a projection 211 that extends vertically upwards from the first horizontal arm 210. The second horizontal arm 220 comprises a cut-out 221 and a recessed portion 222. These auxiliary structures of the elastic metal sheet element 200, namely the projection 211, the cut-out 221 and the recessed portion 222 are just exemplary and other auxiliary structures can be used by a skilled person for the purposes of positioning and connecting the elastic metal sheet element 200 with respective connector elements. E.g. instead of or additionally to the recessed portion 222, the second horizontal arm 220 may comprise one or several projections that may extend vertically downwards from the second horizontal arm 220. The second horizontal arm has a length L2 so that in a top view, a portion 225 of the second horizontal arm 220 is not covered by the first horizontal arm 210 or the transverse arm 230. The cut-out 221 is disposed in this uncovered portion 225. This allows that the cut-out 221 is relatively freely accessible.

In the following, example geometrical values are provided for the elastic metal sheet element 200:
length L1 of the first horizontal arm: 5.25 mm
length L2 of the second horizontal arm: 15.1 mm
length L3 of the transverse arm: 8.5 mm
radius R1 of the first curved section: 0.85 mm
radius R2 of the second curved section: 0.55 mm
thickness d of the metal sheet: 0.15 mm
width w3 of the transverse arm: 1.79 mm.

Figure 4A:
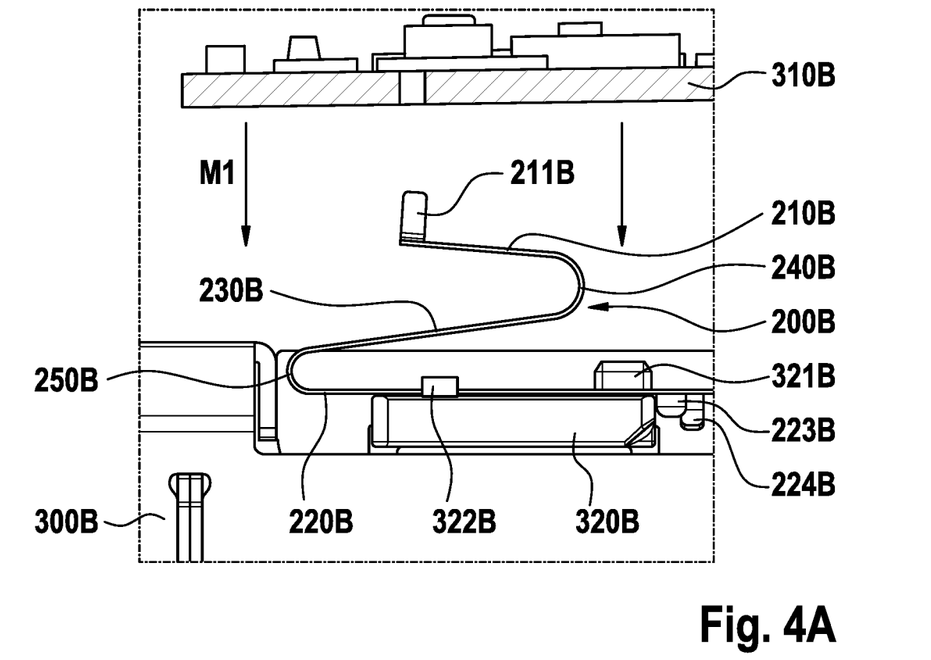
FIG. 4A is a depiction of an example electrical connector in an unloaded assembly state prior to being fully connected.
Figure 4B:
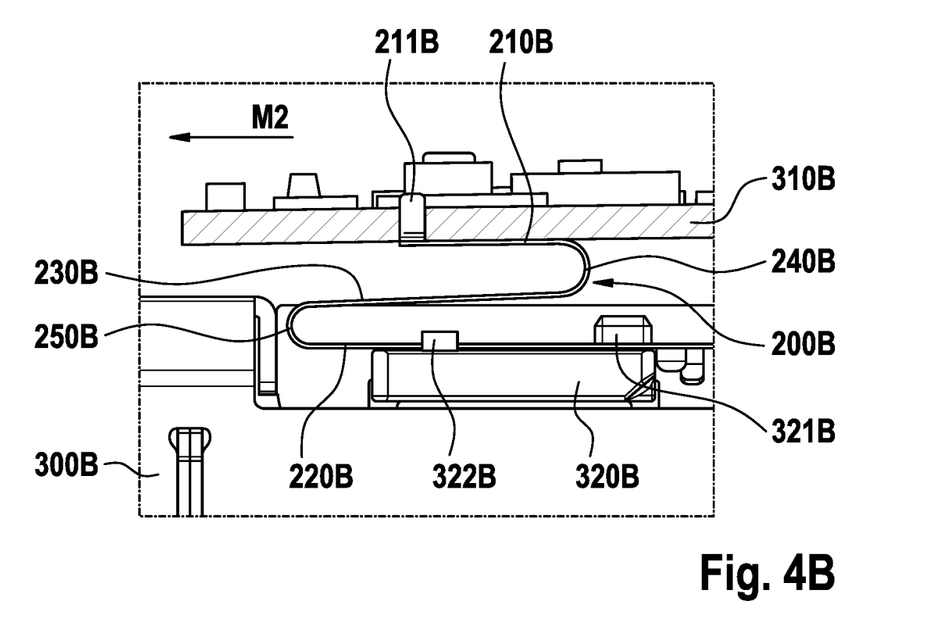
FIG. 4B is a depiction of a later assembly state of the connector element shown in FIG. 4A, in which the electrical connector is in the final position.

FIG. 4A shows an intermediate state of an elastic metal sheet element 200B that is already placed on a connector element 320B, which connector element 320B is here a portion of a plastic holder (i.e. bobbin) for a coil of a drive unit. FIG. 4A shows the elastic metal sheet element 200B in the specified shape, i.e. in an unloaded state. The metal sheet, after having been stamped (or laser-cut) into the correct flat shape, is plastically deformed by respective bending and pressing machines that strain the metal sheet beyond its elastic limit so that the elastic metal sheet element 200B takes its specified shape instead of moving back into the flat shape. FIG. 4B shows the elastic metal sheet element 200B in the shape it takes once the connector element 310B (here: a PCB) is mounted in its final position at the mounting structure (by moving it first down in accordance with arrows M1 and then moving it sideward in accordance with arrow M2 in FIG. 4B). It can be seen that the elastic metal sheet element 200B has two projections 223B and 224B that extend vertically downwards from the second horizontal arm 220B. A holding element 321B extends through a cut-out in the second horizontal arm 220B. A projection 322B of the connector element 320B abuts a recessed portion of the second horizontal arm 220B. The auxiliary structures of the elastic metal sheet element 200B and of the connector element 320B serve to enable precise automated positioning of the elastic metal sheet element 200B on the connector element 320B. While this is not shown, the second horizontal arm may be soldered to a contact element to establish a conducting connection with the energy consuming unit (which here is the coil of a drive unit).

It becomes clear from FIG. 4B that the elastic metal sheet element 200B becomes compressed and hence provides a pre-stress force (or: pre-load) between the carrier and the mounting structure. The specified shape of the elastic metal sheet element 200B is chosen so that despite manufacturing tolerances the elastic metal sheet element always needs to be compressed. Once in the compressed state, the upwards extending projection 211B gets caught by an open slot in the connector element 310B when the connector element 310B is horizontally moved towards the projection 211B and thus the projection 211B automatically aligns with this slot in the assembly process. Due to the pre-load, the projection 211B extends beyond the top surface of the connector element 310B in a defined manner so that an automated soldering of the projection 211B to the connector element 310B is enabled. The elastic metal sheet element 200B has a specified shape. Due to the kind of manufacturing process, the specified shape is only achieved within a certain tolerance range.

Figure 5:
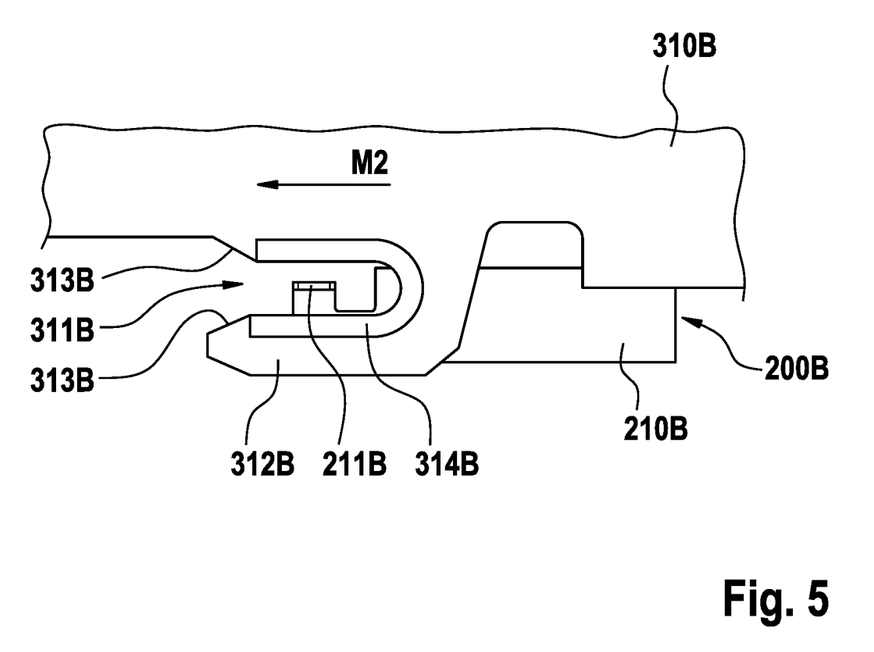
FIG. 5 is a top view onto a connector element and the electrical connector when they are in the final spatial position prior to connecting the electrical connector with the connector element.

FIG. 5 is a top view onto a portion of the connector element 310B and the first horizontal arm 210B of the electrical connector 200B. These two objects are shown in their final spatial relationship, i.e. when the connector element 310B was already moved in the direction of arrow M2. While this is not shown in FIG. 5, the horizontal movement of the connector element 310B in direction M2 also serves to couple the connector element 310B with the mounting structure so that it becomes fixedly secured at the mounting structure. The projection 211B of the electrical connector 200B now is positioned in a slot 311B of the connector element 310B, where the slot 311B is formed by a lateral finger 312B. The slot 311B is open on one side (here the left side with respect to the regular paper orientation). The open side comprises chamfers 313B that support guiding the projection 211B into the slot when the connector element 310B is moved in direction M2. In a next manufacturing step, the projection 211B may be soldered to a conductive area 314B provided on the connector element 314B. The conductive area 314B is conductively coupled with the energy source. This shall not exclude that other means of conductively connecting the electrical connector may be used, e.g. a conductive wire that is wound around a portion of the electrical connector.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A personal-care device comprising:
   a handle having a longitudinal axis;
   a treatment head connected with a carrier extending within the handle and mounted at the handle for pivoting motion around a pivot axis against a restoring spring force;
   a drive unit mounted on the carrier;
   at least one electrical connector arranged between the handle and the carrier to convey electrical energy from an energy source fixedly mounted with respect to the handle to the drive unit;
   wherein the electrical connector is realized as an elastic metal sheet element having a spring constant for providing at least a part of the restoring spring force,
   wherein the elastic metal sheet element is S-shaped or Z-shaped and has a first horizontal arm, a second horizontal arm, and a transverse arm connecting the first and second horizontal arms, and wherein the second horizontal arm has a cut-out through which a plastic connector finger extends and that is plastically deformed and holds the second horizontal arm in place.

2. The personal-care device of claim 1, wherein the elastic metal sheet element is pre-loaded in a rest position of the carrier, wherein the pre-load force has a value in the range of between 0.1 N and 0.6 N.

3. The personal-care device of claim 2, wherein the pre-load force has a value of from 0.2 N to 0.5 N.

4. The personal-care device of claim 2, wherein the pre-load force has a value of from 0.3 N to 0.4 N.

5. The personal-care device of claim 1, wherein the metal sheet element has a projection vertically extending from the first horizontal arm, which projection is fixedly connected to a contact area of a contact element on one of the carrier or handle by means of an electrically conductive connection.

6. The personal-care device of claim 5, wherein the projection is disposed in a slot of the contact element, wherein the slot extends perpendicular to the extension direction of the projection and has one open side.

7. The personal-care device of claim 6, wherein the slot is chamfered at the open side.

8. The personal-care device of claim 1, wherein the metal sheet element is made from a copper alloy.

9. The personal-care device of claim 1, wherein the metal sheet material has a sheet thickness in a range selected from the group consisting of a range of between 0.1 mm and 0.2 mm and a range of between 0.125 mm and 0.175 mm.

10. The personal-care device of claim 9, wherein the metal sheet material has a sheet thickness of about 0.15 mm.

11. The personal-care device of claim 1, wherein the metal sheet element has a projection vertically extending from the second horizontal arm of the metal sheet element, wherein the projection abuts a side of a contact element, or wherein the metal sheet element comprises a recessed portion that abuts a projection of the contact element.

12. The personal-care device of claim 1, wherein the horizontal arms of the metal sheet element essentially serve to connect the metal sheet element with contact elements, and the transverse arm provides a spring function along an active length, wherein the active length is in a range selected from a range of between 5 mm and 15 mm and a range of between 6 mm and 10 mm.

13. The personal-care device of claim 12, wherein the active length is about 8.5 mm.

14. The personal-care device of claim 1, wherein the transverse arm of the metal sheet element has a width selected from the group consisting of a width of between 1 mm and 5 mm, a width of between 1.2 mm and 3 mm, a width of between 1.3 mm and 2 mm, and a width of about 1.8 mm.

15. The personal-care device of claim 1, comprising at least one spring element having a spring constant and arranged between the carrier and the handle so that the spring element adds to the restoring spring force acting between the carrier and the handle when the carrier is pivoted out of its rest position, wherein the spring element provides more than 50% of a total restoring spring force acting between the carrier and the handle.

16. The personal-care device of claim 15, wherein the spring element comprises a rectangular bar.

17. The personal-care device of claim 1, wherein a mechanical stopper element is provided at the handle to define a rest position of the carrier with respect to the handle.

18. The personal-care device of claim 1, wherein the spring constant of the metal sheet element is about 0.32 N/mm.

19. A personal-care device comprising:
a handle having a longitudinal axis;
a treatment head connected with a carrier extending within the handle and mounted at the handle for pivoting motion around a pivot axis against a restoring spring force;
a drive unit mounted on the carrier;
at least one electrical connector arranged between the handle and the carrier to convey electrical energy from an energy source fixedly mounted with respect to the handle to the drive unit;
wherein the electrical connector comprises an elastic metal sheet element having a spring constant for providing at least a part of the restoring spring force, wherein the spring constant is between 0.1 N/mm and 0.55 N/mm.

20. The personal-care device of claim 19, wherein the spring constant is between 0.2 N/mm and 0.45 N/mm.

21. The personal-care device of claim 19, wherein the spring constant of the metal sheet element is about 0.32 N/mm.

22. A personal-care device comprising:
a handle that can be grasped by a user's hand, the handle having a longitudinal axis;
a treatment head that is connected with a carrier, which carrier extends within the handle and is mounted at the handle for pivoting motion around a pivot axis against a restoring spring force;
a drive unit mounted on the carrier;
at least one electrical connector arranged between the handle and the carrier to convey electrical energy from an energy source fixedly mounted with respect to the handle to the drive unit;
wherein the electrical connector is realized as an elastic metal sheet element having a spring constant for providing at least a part of the restoring spring force,
wherein the elastic metal sheet element is S-shaped or Z-shaped and has a first horizontal arm, a second horizontal arm, and a transverse arm connecting the first and second horizontal arms,
wherein the metal sheet element has a projection vertically extending from the first horizontal arm and fixedly connected to a contact area of a contact element on one of the carrier or handle by means of an electrically conductive connection, and
wherein the projection is disposed in a slot of the contact element, said slot having one open side and extending perpendicular to the extension direction of the projection.

23. A personal-care device comprising:
a handle that can be grasped by a user's hand, the handle having a longitudinal axis;
a treatment head that is connected with a carrier, which carrier extends within the handle and is mounted at the handle for pivoting motion around a pivot axis against a restoring spring force;
a drive unit mounted on the carrier;
at least one electrical connector arranged between the handle and the carrier to convey electrical energy from an energy source fixedly mounted with respect to the handle to the drive unit;
wherein the electrical connector is realized as an elastic metal sheet element having a spring constant for providing at least a part of the restoring spring force,
wherein the device comprises at least one spring element having a spring constant and arranged between the carrier and the handle so that the spring element adds to the restoring spring force acting between the carrier and the handle when the carrier is pivoted out of its rest position, wherein the spring element provides more than 50% of a total restoring spring force acting between the carrier and the handle,
wherein the spring element comprises a rectangular bar.

* * * * *